Aug. 19, 1930.  W. C. KEYS  1,773,584

BRAKE

Filed June 15, 1922

Inventor
WALTER C. KEYS.
by
Attorney

Patented Aug. 19, 1930

1,773,584

UNITED STATES PATENT OFFICE

WALTER C. KEYS, OF DETROIT, MICHIGAN, ASSIGNOR, BY MESNE ASSIGNMENTS, TO BENDIX BRAKE COMPANY, OF CHICAGO, ILLINOIS, A CORPORATION OF ILLINOIS

BRAKE

Application filed June 15, 1922. Serial No. 568,614.

This invention relates to brake mechanism and more particularly to an improved brake band, and improved means for preventing rattling.

An object of the invention is to provide a brake band that will have all of the advantages of the so-called rigid shoe brake and yet not be as costly as the shoe brakes now in use. The invention is particularly applicable to motor vehicles and a further object of the invention is to provide a comparatively light construction that will be, nevertheless, sufficiently strong and rigid for the service to which it will be subjected and which, to this end, may be made from sheet metal by comparatively simple operations.

A further object of the invention is to provide a simple and reliable device for preventing the shoes from rattling when not in use.

Other objects of the invention and the features of novelty will be apparent from the following description taken in connection with the accompanying drawings, of which:

Figure 1:
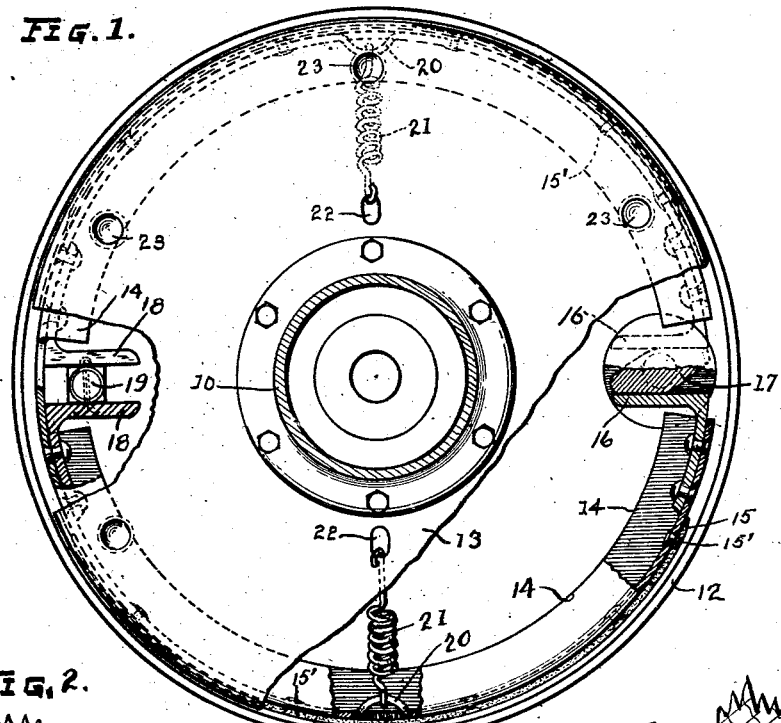
Figure 1 is a side elevation of a brake mechanism embodying the invention, parts being broken away and other parts being shown in section.
Figure 2:
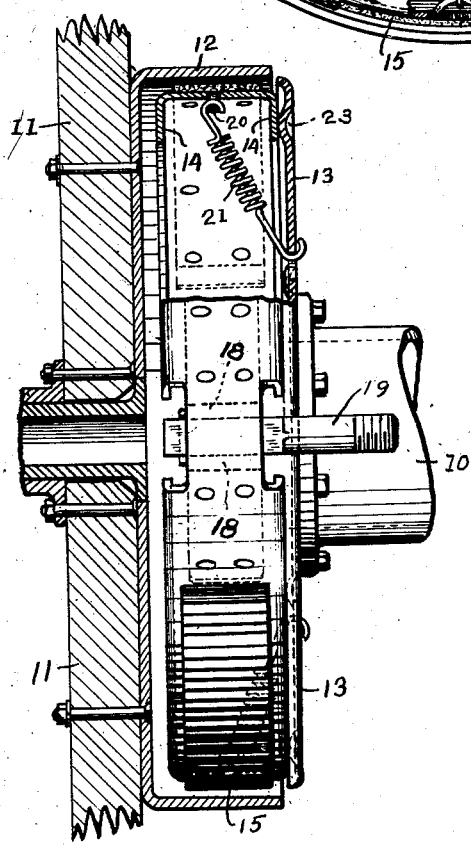
Fig. 2 is a section with parts shown in elevation and in association with parts of a wheel and axle.
Figure 3:
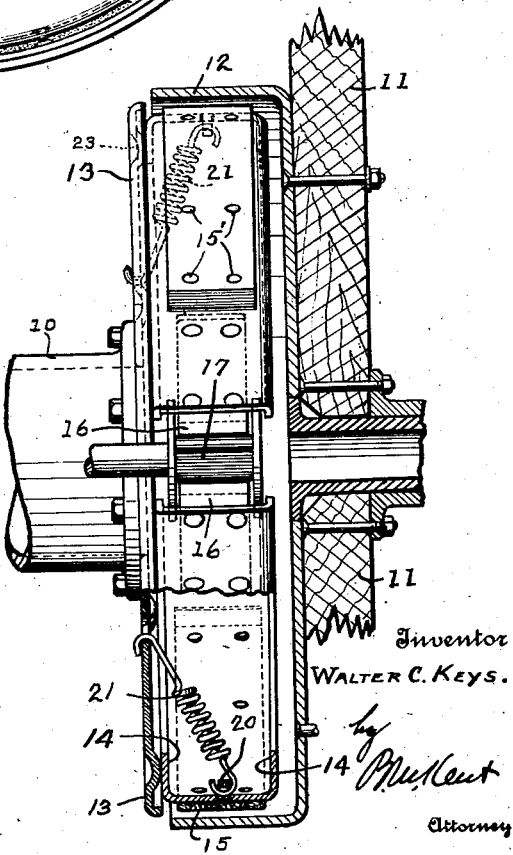
Fig. 3 is a view similar to Fig. 2 but looking from the opposite side.

Referring to the drawings, 10 indicates the end of an axle housing and 11 the spokes of a wheel which carries the brake drum 12. The brake drum is of the usual type, pressed from sheet metal and the open side of the drum is closed by the plate 13 which is secured to the axle housing 10.

The brake proper consists of a band, of U-shaped cross-section, having the side flanges 14. The band is shaped to conform to the interior of the drum 12 and carries on its periphery, the friction material or lining 15, this being secured by rivets 15' in the ordinary fashion. The ends of the band are spaced apart and carry the brackets 16 between which the cam member 17 for actuating the brake, is arranged, this being the ordinary arrangement in motor vehicle brakes.

Midway between the ends of the band the flanges 14 are cut away to give increased flexibility, and brackets 18 are secured at this point, these brackets being spaced apart to receive the anchor pin 19 which holds the band from rotation with the drum 12.

By cutting away the flanges 14, adjacent the point of anchorage, the band is practically converted into two shoes movable more or less independently to and from contact with the drum 12 and, in effect, analogous to the separate cast shoes of the ordinary shoe brake. The band illustrated may be easily formed on a rolling machine, from a flat strip and, as will be evident from the drawings, produces a very light construction which, owing to the flanges 14, will, nevertheless, have the requisite characteristics of rigidity, for a shoe brake.

Another feature of novelty is the depressed spring anchorages 20 which are formed in the surface of the brake band at the points indicated. To form these anchorages the metal is sheared on two parallel lines, for a short distance circumferentially of the band and the material between these lines of shearing is depressed inwardly to form a loop, as shown in Fig. 1. The springs 21 have one end attached to the anchorages 20 and their other ends connected into the openings 22 in the plate 13. The springs 21, therefore, tend not only to draw the ends of the brake band together on the cam 17 but also tend to draw the band against the plate 13 and prevent rattling. I have provided depressions 23 in the plate 13 to contact with one of the side flanges of the brake band and thus keep the brake band out of contact with the plate 13 except at these particular points.

Having thus described my invention, what I claim is:

1. In brake mechanism, the combintion of a brake shoe formed of sheet metal and provided with side flanges, a side plate having a plurality of widely separated projections on the side adjacent said shoe and engaging one of said flanges laterally to prevent said flange from coming into contact with the main surface of said side plate and springs attached to said shoe and to said plate and arranged at an angle to the plane of the plate to hold the flange of the shoe against said projections to prevent rattling.

2. A brake friction member formed of sheet metal and extending integrally substantially a complete circumference and having integral therewith spaced-apart stiffening flanges to form a substantially rigid member, an anchor part, and a pair of separate parts secured to said member between the flanges and formed with opposite parallel plane surfaces slidably engaging said anchor part between them.

In testimony whereof I affix my signature.

WALTER C. KEYS.